US011487724B1

(12) United States Patent
Gertonson et al.

(10) Patent No.: US 11,487,724 B1
(45) Date of Patent: Nov. 1, 2022

(54) SYSTEM AND METHOD FOR DATA MOVEMENT AND DEFECT CORRECTION

(71) Applicant: UIPCO, LLC., San Antonio, TX (US)

(72) Inventors: Eric Martin Gertonson, San Antonio, TX (US); Robert Hugh Newman, II, San Antonio, TX (US); Christopher John Hohimer, Boerne, TX (US); Jonathan Allen Meadows, Phoenix, AZ (US); Brett Justin Moan, Surprise, AZ (US); Eric Overstreet, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 222 days.

(21) Appl. No.: 16/886,842

(22) Filed: May 29, 2020

(51) Int. Cl.
*G06F 16/00* (2019.01)
*G06F 16/215* (2019.01)
*G06F 16/23* (2019.01)
*G06F 16/25* (2019.01)
*G06F 16/21* (2019.01)
*G06F 16/28* (2019.01)

(52) U.S. Cl.
CPC .......... *G06F 16/215* (2019.01); *G06F 16/219* (2019.01); *G06F 16/2322* (2019.01); *G06F 16/254* (2019.01); *G06F 16/283* (2019.01)

(58) Field of Classification Search
CPC .. G06F 16/254; G06F 16/283; G06F 16/2322; G06F 16/219; G06F 16/215
See application file for complete search history.

(56) References Cited

U.S. PATENT DOCUMENTS

| | | | |
|---|---|---|---|
| 10,614,091 B1* | 4/2020 | Kapoor ................. | G06F 16/254 |
| 2009/0281985 A1* | 11/2009 | Aggarwal ............. | G06F 16/254 |
| 2011/0047525 A1* | 2/2011 | Castellanos .......... | G06F 9/4494 |
| | | | 718/103 |
| 2013/0268567 A1* | 10/2013 | Adjei-Banin ......... | G06F 16/254 |
| | | | 707/812 |
| 2020/0334268 A1* | 10/2020 | Vasireddy ............. | G06F 16/211 |
| 2021/0271686 A1* | 9/2021 | Abdul Rasheed .. | G06F 16/2379 |

* cited by examiner

*Primary Examiner* — Leslie Wong
(74) *Attorney, Agent, or Firm* — Plumsea Law Group, LLC (57) ABSTRACT

The embodiments provide a system and method for continuously updating a target repository to include both the latest data and corrected historical data. The system includes a data manager and at least two staging repositories. Each time the system retrieves the latest data from the source repository it also retrieves a portion historical data. Both the latest data and the historical data are transformed, and the historical portion of the transformed data is compared with corresponding data from the target repository to determine if there are any defects in the data from the target repository. The target repository is automatically updated if a defect is detected.

20 Claims, 11 Drawing Sheets

SYSTEM AND METHOD FOR DATA MOVEMENT AND DEFECT CORRECTION

TECHNICAL FIELD

The present disclosure generally relates to data, and specifically to data management and storage.

BACKGROUND

In moving data from one repository to another, data is often loaded in an incremental fashion so that newer periods of data build on top of older periods. After identifying a historical defect, the data in a storage system may be manually backed out, or deleted, starting with the latest period and moving backwards in time until a time period before the defect occurred. Once the data defect has been corrected, the data is then reloaded into the data storage system in an incremental manner, starting with the oldest missing period and moving forwards in time until the latest period of data is loaded in. This process may result in significant downtime for a system in which users cannot access data that is being removed and reloaded. Depending on the size of the system, the downtime can last weeks or even months.

There is a need in the art for a system and method that addresses the shortcomings discussed above.

SUMMARY

In one aspect, a method of updating data in a target repository using data from a source repository includes a step of establishing a connection with a source repository, where the source repository includes data for a latest period, data for a first historical period, and data for a second historical period, and where the second historical period is an older period than the first historical period. The method further includes retrieving a latest data portion from the source repository, wherein the latest data portion includes data from the latest period. The method further includes retrieving a historical data portion from the source repository, where the historical data portion includes data from the first historical period and from the second historical period. The method further includes transforming the latest data portion into a transformed latest data portion, transforming the historical data portion into a transformed historical data portion, storing the transformed latest data portion and the transformed historical data portion in a first staging repository, retrieving a target data portion from a target repository and storing the target data portion in a second staging repository, and comparing the transformed historical data portion with the target data portion to determine if there is a defect in the target data portion. The method further includes updating the target repository to include the transformed latest data portion and the transformed historical data portion when there is a defect in the target data portion and updating the target repository with only the transformed latest data portion when there is no defect in the target data portion.

In another aspect, a method of updating data in a target repository using data from a source repository includes a step of establishing a connection with a source repository, where the source repository includes data for a latest period, data for a first historical period, and data for a second historical period, and where the second historical period is an older period than the first historical period. The method further includes retrieving a first historical data portion from the source repository, where the first historical data portion includes data from the first historical period and from the second historical period. The method further includes transforming the first historical data portion into a first transformed historical data portion, comparing the first transformed historical data portion with a corresponding first target data portion from the target repository, and replacing the first target data portion with the first transformed historical data portion if there are differences between the first transformed historical data portion and the first target data portion. The method further includes retrieving a second historical data portion from the source repository, where the second historical data portion includes data from the first historical period and from the second historical period. The method further includes transforming the second historical data portion into a second transformed historical data portion, comparing the second transformed historical data portion with a corresponding second target data portion from the target repository, and replacing the second target data portion with the second transformed historical data portion if there are differences between the second transformed historical data portion and the second target data portion.

In another aspect, a continuous data quality system for moving data from a source repository to a target repository includes a data manager, a first staging repository, and a second staging repository. The data manager is configured to retrieve data from the source repository, transform the retrieved data into transformed data, store the transformed data in the first staging repository, retrieve target data from the target repository, store the target data in the second staging repository, compare the transformed data with the target data, and update the target repository.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a system and method for continuously updating a target repository to include both the latest data and corrected historical data. The system includes a data manager and at least two staging repositories. Each time the system retrieves the latest data from the source repository it also retrieves a historical portion of the source data. The historical portion of the source data can be defined using data keysets, rather than extracting all the data for a specific time period. Therefore, the historical portion of the source data can include data from multiple historical periods. Both the latest data and the historical portion of the source data are transformed, and the historical portion of the transformed data is compared with corresponding data from the target repository (which can be defined using the same keysets that were used to retrieve the historical portion of source data). If differences are detected, this indicates that the target repository may include data defects caused by changes in the source data that have not been propagated to the target data (or previous coding defects in processing the earlier data). In this case, the data manager can replace the corresponding historical data in the target repository with the historical portion of the transformed data while simultaneously loading in the latest dataset to the target repository. If no defects are detected only the latest dataset may be loaded and the historical data in the target repository may be left unchanged. The system cycles through loading and comparing different historical data portions from the source repository with the data stored in the target repository so that the all the historical data in the target repository can be updated over a predetermined number of update cycles.

The embodiments provide a system that automatically detects defects in target data by continually comparing all previously loaded data elements in the target repository to the most up-to-date versions of the same data from the source repository. Thus, using this system, the accuracy of the data is improved over systems that rely on manual defect detection. The target data is also corrected near instantaneously, as any defective data can be immediately reprocessed and swapped in for the defective data without requiring a multi-step process of deleting previous historical data periods and reloading them in a sequential manner into the target repository. Thus, using this system, the downtime associated with a particular resource (a database table, or a data mart, for example) in the target repository is reduced from weeks or months to seconds (or less). The embodiments also provide a system for automatically notifying operators and/or end users of the system of any defects and automated changes made by the system.

Figure 1:
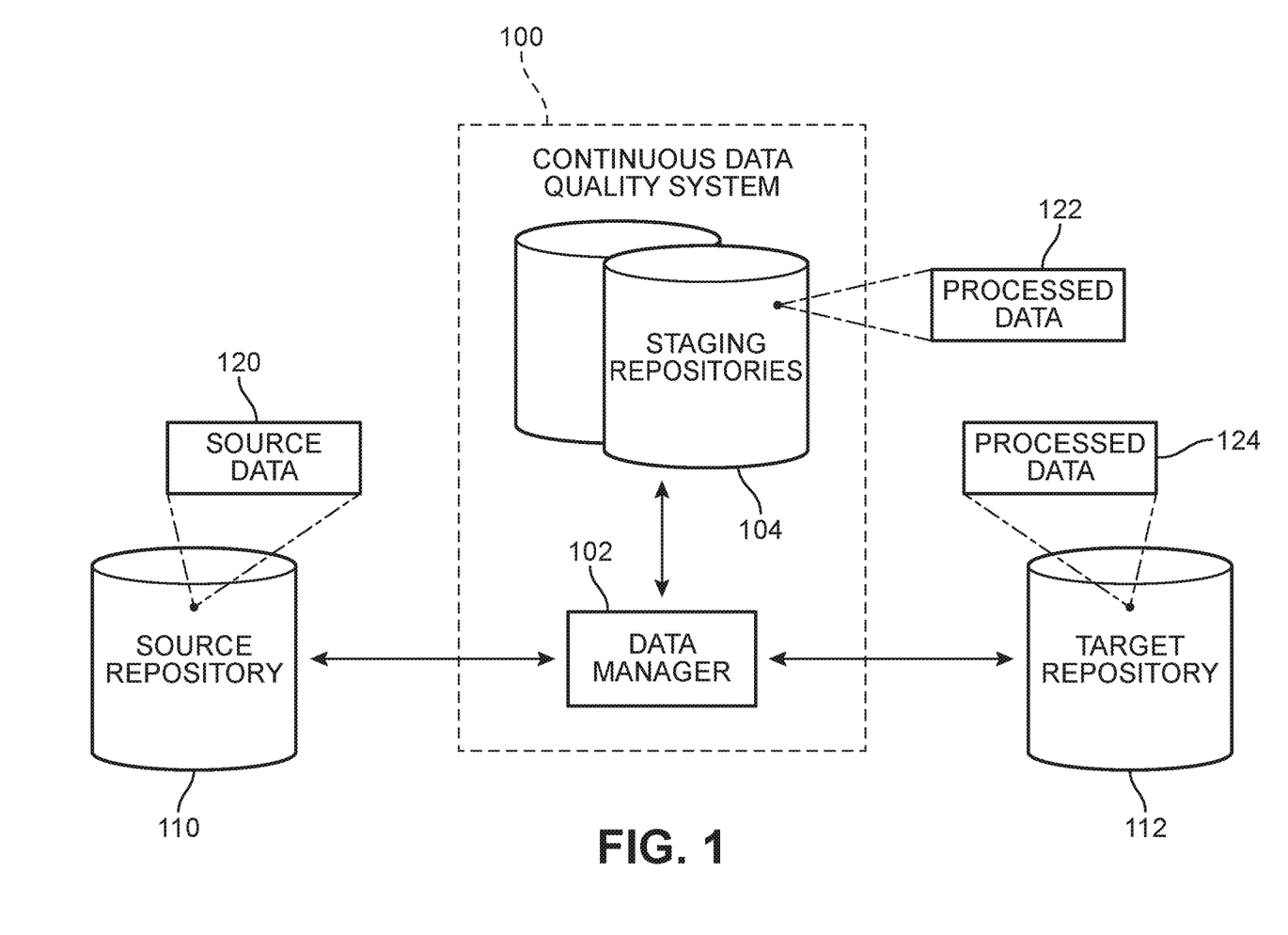
FIG. 1 is a schematic view of a continuous data quality system in communication with a source repository and a target repository, according to an embodiment.

FIG. 1 is a schematic view of a configuration of a continuous data quality system 100 in communication with various repositories of data. CDQ system 100 is in communication with a source repository 110 as well as a target repository 112. As used herein, the term "source repository" refers to any data storage system (such as a database or collection of databases) that includes retrievable data. Also, the term "target repository" refers to any data storage system that can receive data. In operation, CDQ system 100 may retrieve data from source repository 110, process the data into a suitable form, and then deposit the processed data into target repository 112.

As an example, an organization may retrieve data from one or more operational systems. This data is initially stored in a centralized data warehouse, which may include the raw data, metadata and/or summary data. The organization may also have one or more data marts that comprise separate (and possibly smaller) data storage systems associated with different aspects of the organization. In this example, the data warehouse may comprise a source repository and the data marts comprise target repositories. A CDQ system could control the movement and processing of data from the data warehouse to the data marts. Alternatively, the operational systems may comprise source repositories and the data warehouse may comprise a target repository. A CDQ system could control the movement and processing of data from the operational systems to the data warehouse. In still other examples, one or more CDQ systems could control the movement and processing of data between operational systems and a data warehouse and also between the data warehouse and one or more data marts.

Continuous data quality system 100, also referred to simply as CDQ system 100, comprises a data manager 102 and a set of staging repositories 104. Data manager 102 comprises resources for processing data, while staging repositories 104 may be used to temporarily store data for purposes of comparing different data, as described in further detail below. Staging repositories 104 could comprise any number of repositories. These could include databases or any other suitable data storage systems.

As seen in FIG. 1, source data 120 is stored in source repository 110. By contrast, staging repositories 104 and target repository 112 both store data that has been processed by data manager 102. Specifically, staging repositories 104 store first processed data 122 and target repository 112 stores second processed data 124. Processed data includes any data that has been retrieved (or extracted) by CDQ system 100 (or a related data management system) and loaded into one or more repositories. In some cases, processed data may be transformed before it is loaded into one or more repositories. In other cases, processed data could simply be copied from source repository 110.

Figure 2:
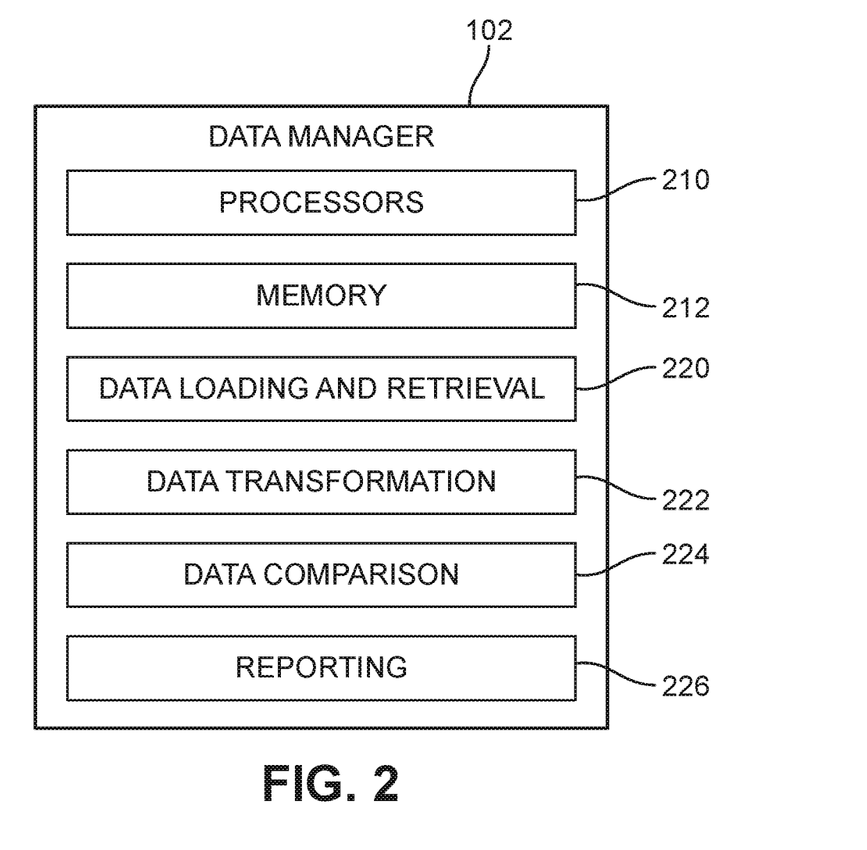
FIG. 2 is a schematic view of a data manager, according to an embodiment.

FIG. 2 is a schematic view of data manager 102, according to an embodiment. Data manager 102 may comprise one or more computing systems including processors 210 and memory 212. Memory 212 may comprise a non-transitory computer readable medium. Instructions stored within memory 212 may be executed by the one or more processors 210.

Data manager 102 may also include various processing modules. Some embodiments may include a data loading and retrieval module 220. Module 220 may be used to retrieve data from a source repository as well as to load data into one or more staging repositories and/or a target repository. Thus, module 220 may include any necessary application program interfaces (APIs) for communicating with source repository 110, as well as staging repositories 104 and target repository 112.

As part of a data management process, data from a source may be transformed prior to being loaded into a target repository. As used herein, the term data transformation refers to any change made to the data including simple formatting changes, rearrangement of data elements, as well as more complex transformations that generate derivative data from source data. For example, source data could comprise raw financial transaction data stored in a data warehouse. A data manager could then transform the raw financial data into various kinds of summary data that can be stored in a data mart and queried by end users.

Data manager 102 may also include a data transformation module 222. Data transformation module 222 may be used to convert source data into a suitable format. Also, data transformation module 222 may be used to generate derivative data based on source data as input.

Data manager 102 may also include data comparison module 224. Data comparison module 224 may be used to compare two data sets. For example, as described in further detail below, CDQ system 100 may compare data stored in two different staging repositories to look for data defects.

Data manager 102 may also include a reporting module 226. Reporting module 226 may be used to report information to end users of CDQ system 100. As one example, reporting module 226 could provide summary information about any differences detected by data comparison module 224.

Figure 3:
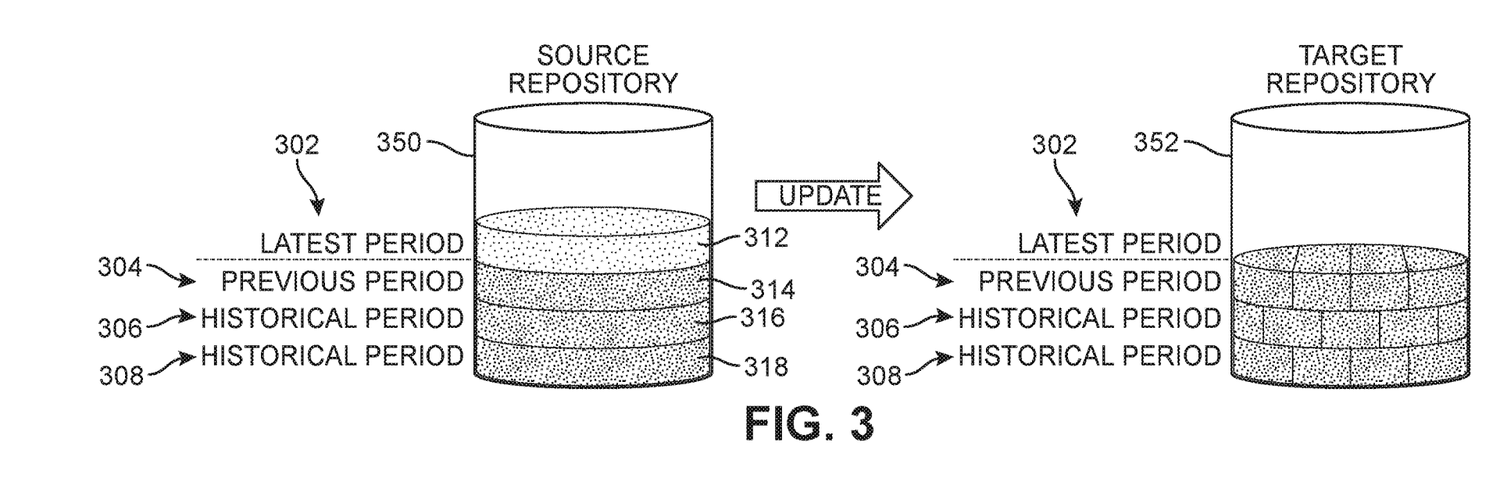
FIG. 3 is a schematic view of a source repository and a target repository, according to an embodiment.

FIG. 3 is a schematic view of a source repository 350 and a target repository 352, according to an embodiment. Referring to FIG. 3, source repository 350 comprises data that is organized according to time. Specifically, source data 300 is divided into various segments (or sets) corresponding to different periods of time. In this example, the periods of time are a latest period 302, a previous period 304, a first historical period 306 and a second historical period 308. As used herein, "period" can refer to any suitable time frame. As seen in FIG. 3, source data 300 is comprised of a first data segment 312 for the latest period 302, a second data segment 314 for the previous period 304, a third data segment 316 for the first historical period 306 and a fourth data segment 318 for the second historical period 308.

As seen in FIG. 3, target repository 352 also stores data that is divided into similar time periods. It may be appreciated that the data in each repository may not be identical. In some cases, data retrieved from source repository 350 may be transformed before it is stored in target repository 352. As an example, the source data could include data tables with many different fields that are not necessary for the end users of a target repository, and so the data in the target repository may not include any superfluous data fields.

Figure 4:
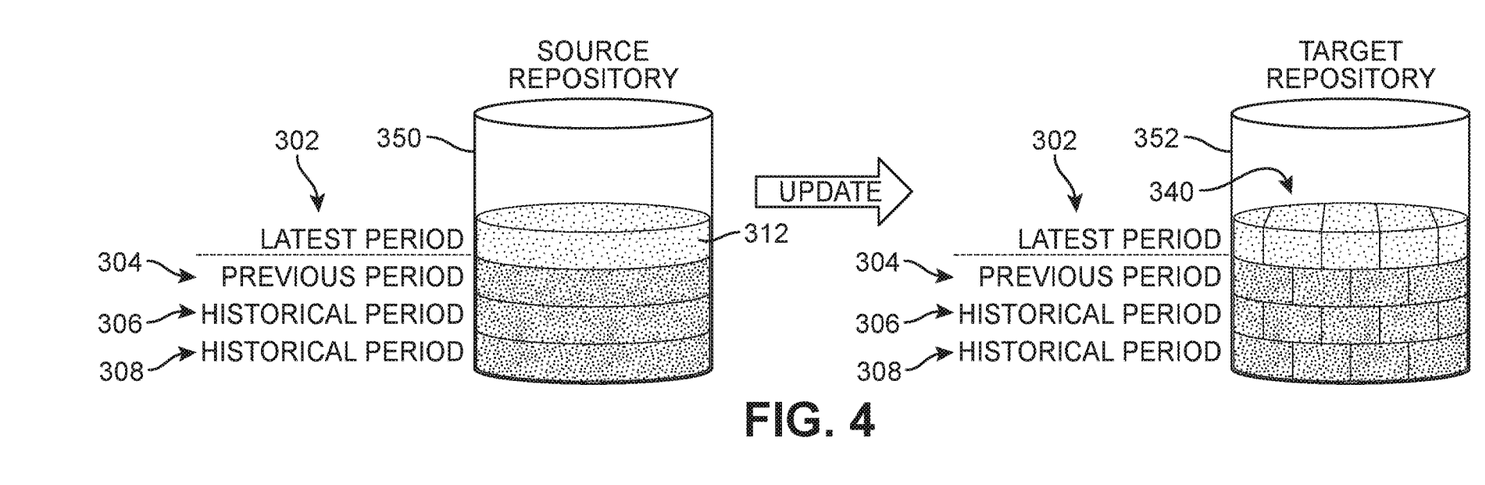
FIG. 4 is a schematic view of an update being performed from a source repository to a target repository, according to an embodiment.

FIG. 4 illustrates a schematic view of a method of updating target repository 352 with the latest source data, according to one embodiment. As seen in FIG. 4, first data segment 312 for latest period 302 is retrieved from source repository 350 and stored in target repository 352 as processed data 340. Using the method illustrated in FIG. 4, only data for the latest period is ever retrieved during a typical updating process. If data defects are discovered in the target repository, a separate process must be used to delete existing data and reload (and reprocess) historical data.

Figure 5:
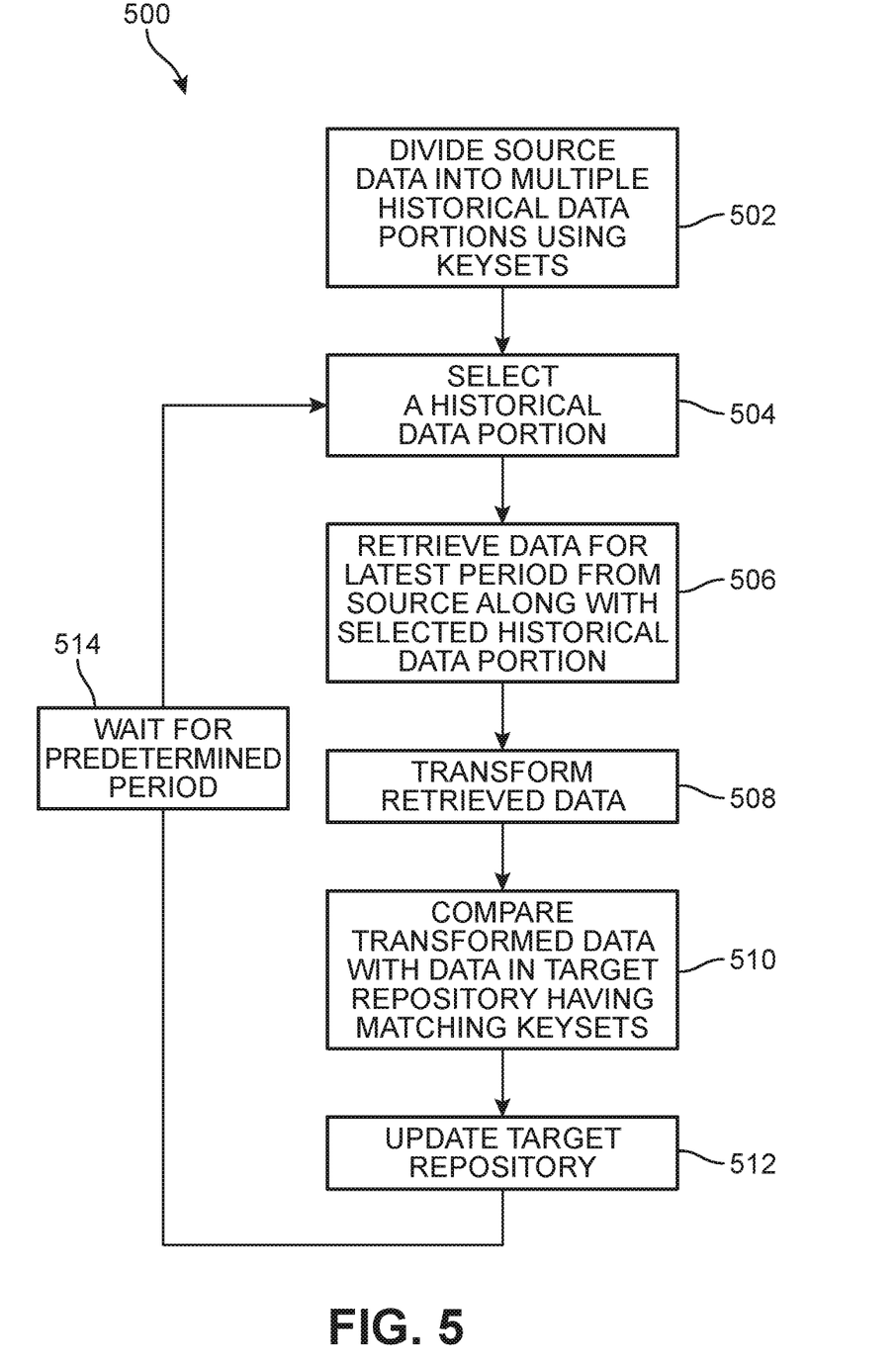
FIG. 5 is a schematic view of a process of updating a target repository with new and corrected data, according to an embodiment.

FIG. 5 is a schematic view of another method 500 for updating a target repository with source data that facilitates the continuous monitoring of data quality in the target repository. Specifically, the following method can be used to ensure that the data in the target repository is updated whenever data defects are found. In some embodiments, one or more of the following steps could be performed by a CDQ system (such as CDQ system 100). Moreover specifically, in some cases, one or more of the following steps could be performed by a data manager (such as data manager 102).

Starting in step 502, CDQ system 100 may divide the historical data from the source repository into multiple portions of historical data. Each portion of historical data (also referred to as a historical data portion) is comprised of data from multiple time periods. Such a division is shown, for example, in FIG. 6. In this case, source repository 602 is comprised of a latest data portion 610 and a set of historical data portions 612. The historical data portions 612 include a first historical data portion 620, a second historical data portion 622, a third historical data portion 624, a fourth historical data portion 626, and a fifth historical data portion 628. Each historical data portion includes data from multiple historical periods. For example, first historical data portion 620 includes data from a previous period 630, a first historical period 632, and a second historical period 634.

Figure 6:
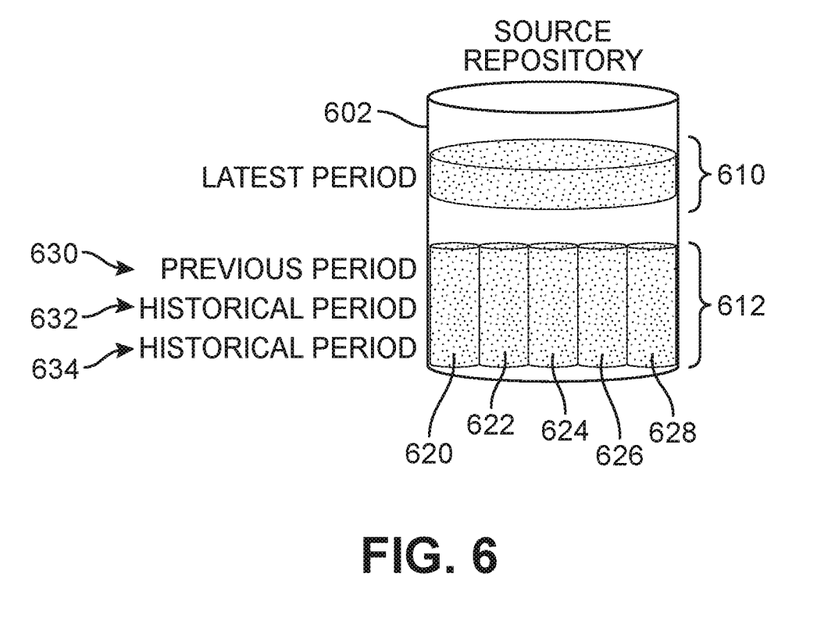
FIG. 6 is a schematic view of a source repository in which the historical data has been divided into separate historical data portions, according to an embodiment.

It may be appreciated that the division of data shown in FIG. 6 is a schematic representation of dividing the historical data in a source repository into distinct groups of data that can be loaded independently. In some embodiments, these historical data portions may be defined by particular keys or keysets associated with the data. As used herein, a "key" or "keyset" refers to one or more data elements in a table or other database structure that can be used to exclusively identify a record (i.e., a row in a database table).

Figure 7:
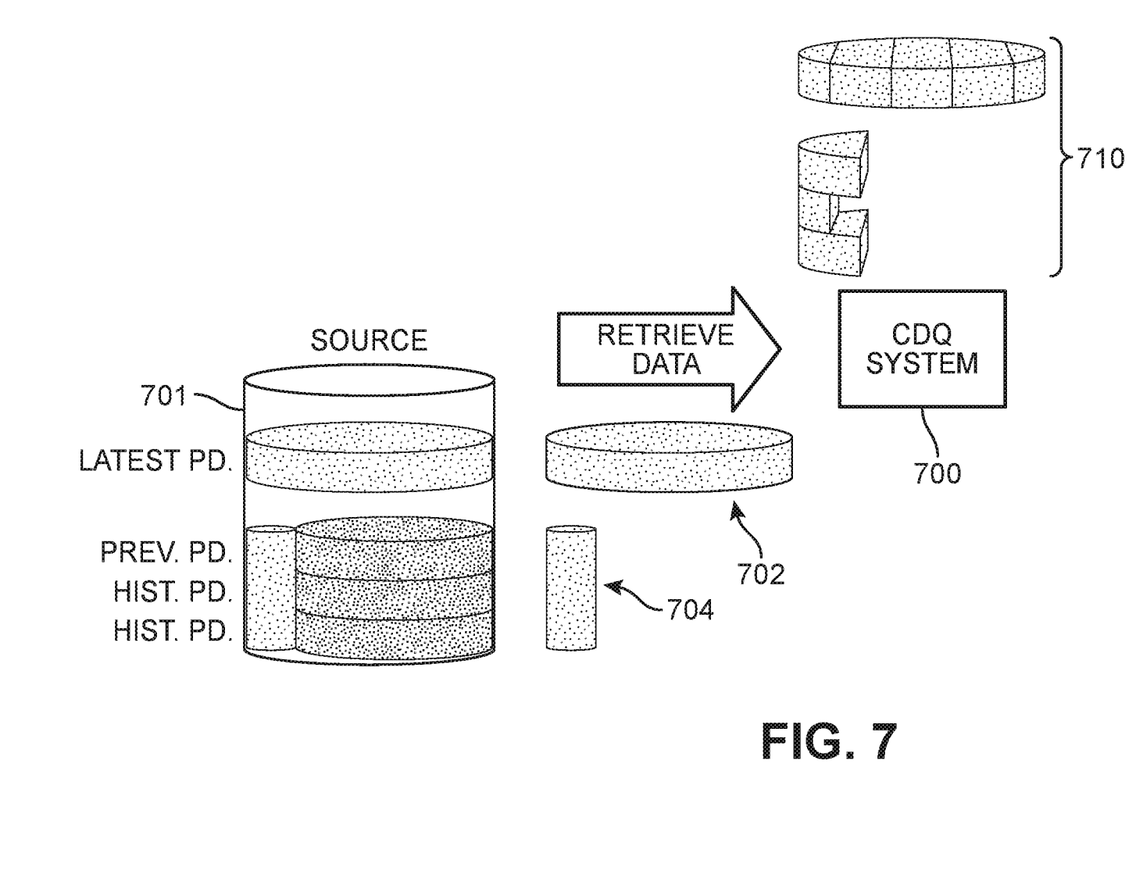
FIG. 7 is a schematic view of a continuous data quality system retrieving a latest data portion and a historical data portion from a source repository, according to an embodiment.

Referring back to FIG. 5, once the data has been divided into multiple historical data portions, the CDQ system may select one of the historical data portions in step 504. In some cases, the CDQ system can first generate a list of historical data portions (defined by different keysets) in step 502, and then select one element from the generated list in step 504. Next, in step 506, the CDQ system may retrieve data for the latest period from the source repository along with the historical data portion that was selected in step 504. As an example, FIG. 7 shows a schematic view of a process of a CDQ system 700 retrieving a latest data portion 702 and a historical data portion 704 from source repository 701.

After retrieving data, a CDQ system may transform the retrieved data in step 508. For example, in FIG. 7, latest data portion 702 and historical data portion 704 are converted into transformed data 710. Next, in step 510, the CDQ system compares the transformed data (such as transformed data 710) with corresponding data in the target repository. Specifically, the same keysets used to extract the current historical data portion may be used to pull a corresponding set of data from the target repository. The goal of this comparison is to see if there are defects in the target repository data. Such defects may arise, for example, if the source data during a given period is updated (or corrected) after the data for that period has already been retrieved and processed. As an example, after finding a coding error, an operational system could fix the error and reprocess the data in the source repository, which may lead to changes in some of the historical data. These latest "updates" to the source repository can be detected when the most recent version of the historical data (including in a historical data portion) is compared with corresponding data in the target repository. In addition, defects in the target data could arise from processing errors performed after data has been extracted from a source repository. If the code causing the processing errors gets fixed, the CDQ system will automatically generate new sets of transformed data without those same processing errors and detect the differences with the target data.

Although the exemplary embodiment discusses a situation where data extracted from a source repository may first be transformed before it is compared with data in a target repository, in other cases the data may not be transformed. There may be situations where the target repository stores a copy of some source data, rather than a transformed version of the same data. In such cases, step 506 and step 508 could be performed with processed data that has not been transformed in any way.

In step 512, the CDQ system may update the target repository. This step includes, at least, adding the portion of the transformed data corresponding to the latest data from the source. If, during step 510, the CDQ system finds defects in the target data corresponding to the transformed historical data portion, then during step 512 the CDQ system will also swap in the transformed historical data portion in for the corresponding target data containing the defects.

In step 514, the CDQ system may wait for a predetermined period corresponding to the period at which data is updated in the source repository. After this predetermined period, the CDQ system will select another historical data portion to extract along with the latest segment of data. Alternatively, the CDQ system could wait to be notified by the source system that new data is available. This process may then be repeated until the CDQ system cycles through each of the different historical data portions, at which point the cycle can be repeated. Using this process, the system may continually look for defects in the historical target data and replace that data whenever defects are found. As an example, in the embodiment of FIG. 6 that depicts a source repository whose data is divided into five distinct historical data portions (e.g., historical data portion 620), the system could rotate through retrieving each of the five historical data portions as it continually retrieves the latest data. This ensures that any corresponding data sets in the target repository are updated at least once during this cycle.

Because the present CDQ system uses data that is loaded and updated by defined keysets, rather than by time periods, data loads can be independent. The load order of the keys does not matter so that the system can reload and reprocess (if necessary) any suitably sized portions of data that can be handled by the systems processing power.

Figure 8:
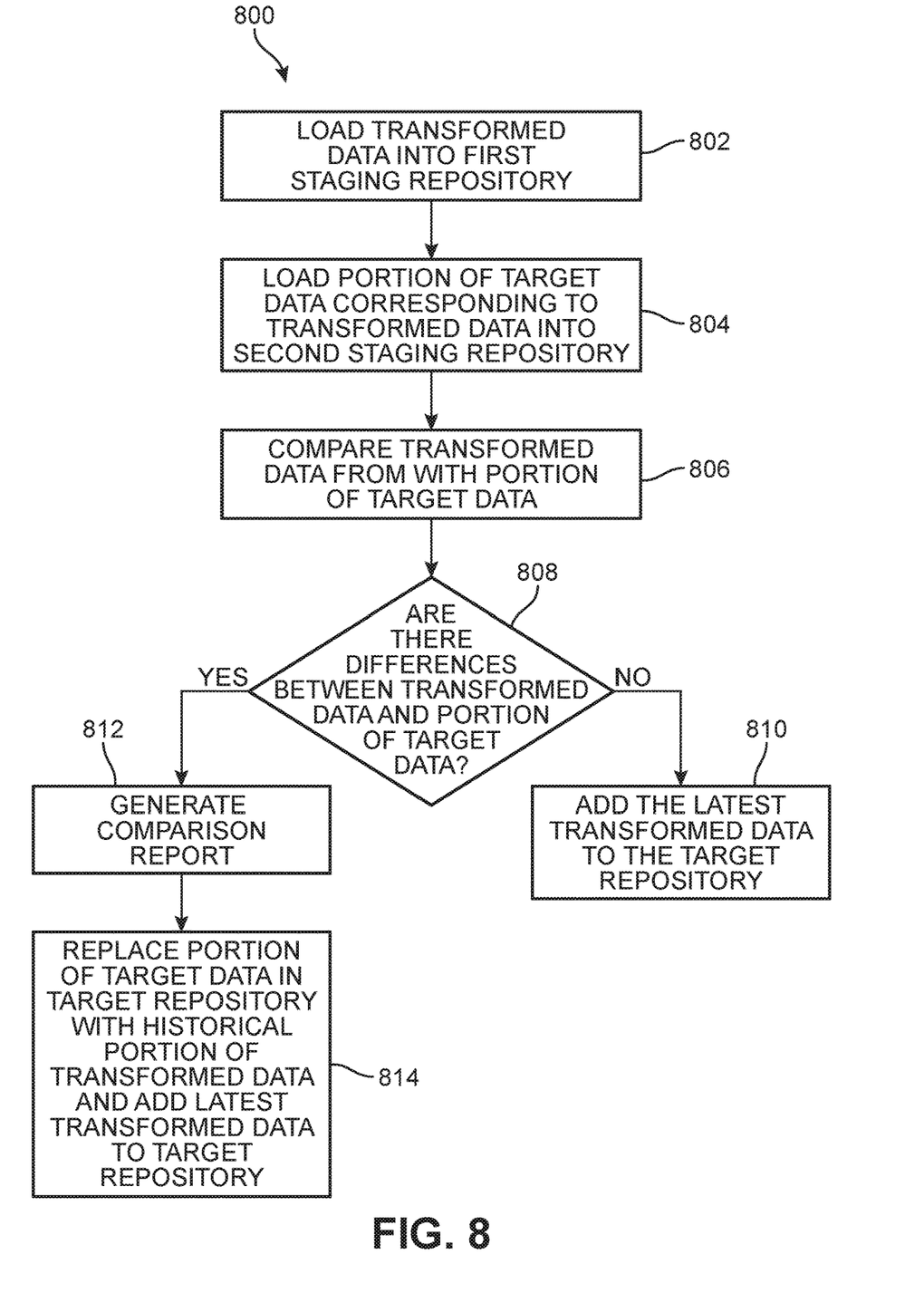
FIG. 8 is a schematic view of a process of updating a target repository, according to an embodiment.

FIG. 8 is a schematic view of a detailed process 800 for loading and comparing data, as well as for updating the target repository. In some embodiments, some of the following steps may be performed by a CDQ system (such as CDQ system 100). In some embodiments, some of the following steps may be performed by a data manager of a CDQ system (such as data manager 102).

Figure 9:
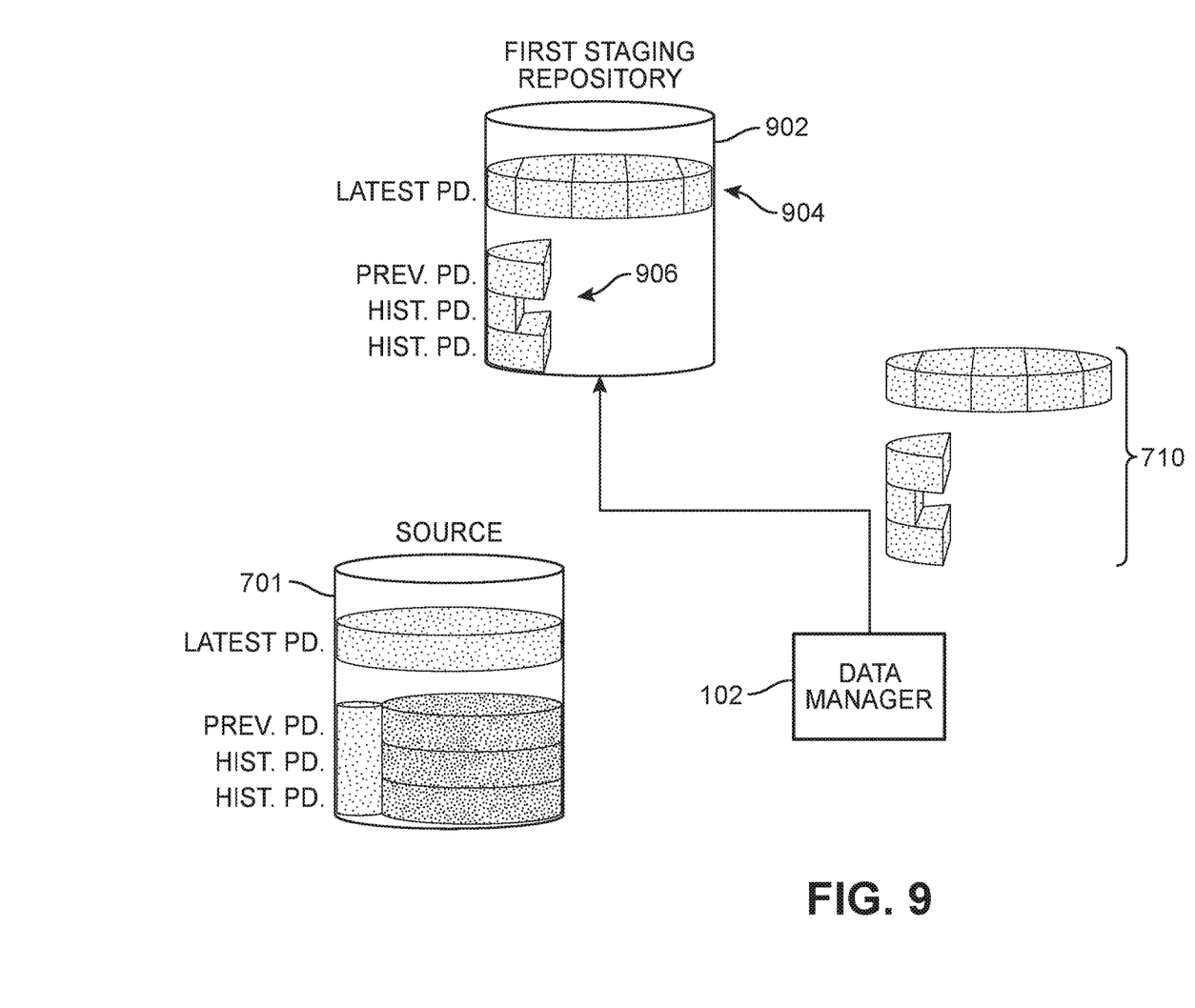
FIG. 9 is a schematic view of a data manager loading transformed data into a first staging repository, according to an embodiment.

In a first step 802, data manager 102 may load the transformed data into a first staging repository. This step is shown in FIG. 9, which shows transformed data 710 being loaded into first staging repository 902. Transformed data 702 includes both a transformed latest data portion 904 and a transformed historical data portion 906.

Figure 10:
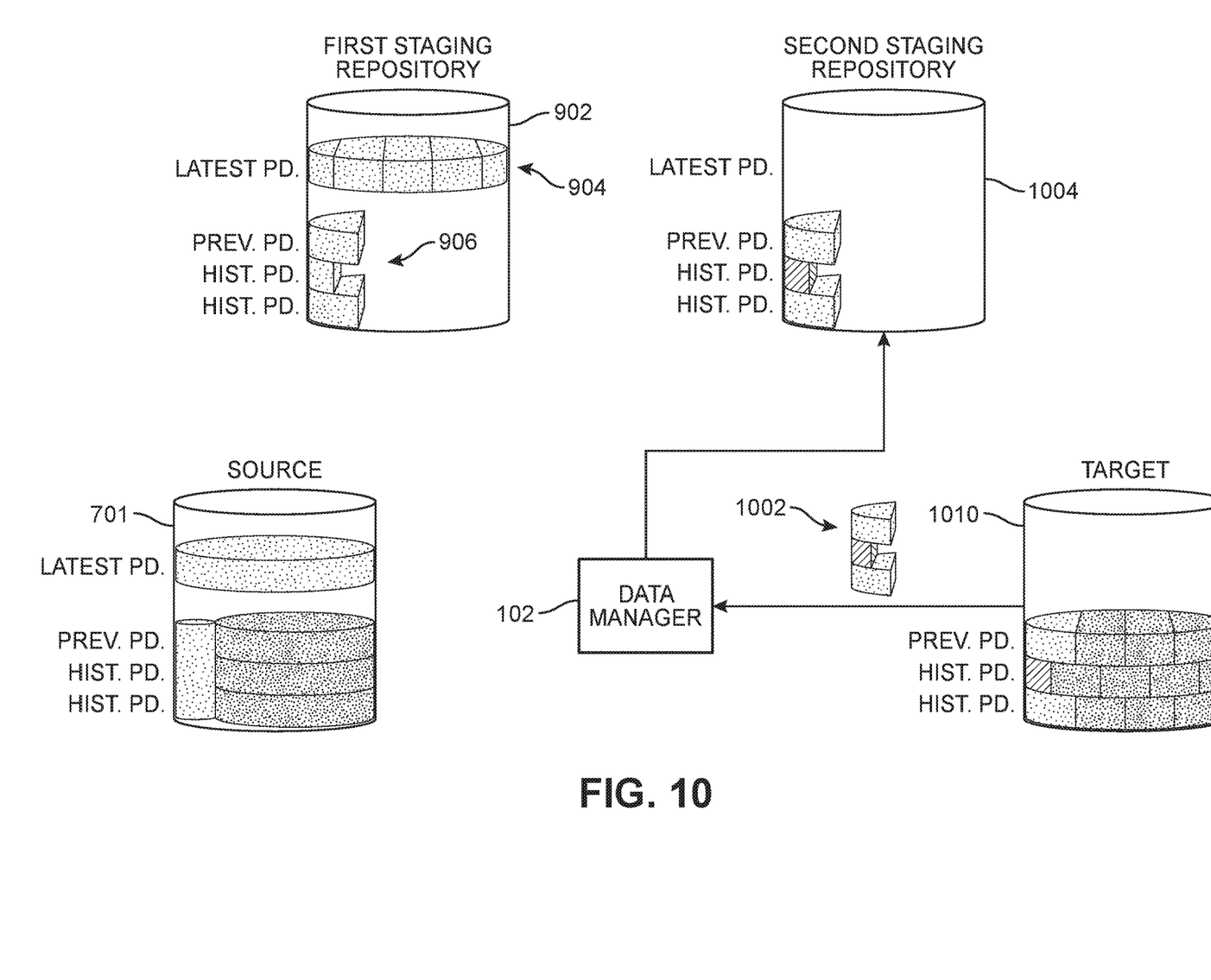
FIG. 10 is a schematic view of a data manager loading data from a target repository into a second staging repository, according to an embodiment.

Next, in step 804, data manager 102 may load a portion of data from the target repository into a second staging repository. Specifically, the portion of data that corresponds with the transformed data stored in the first staging repository. As already described, the same keysets used to extract and transform the source data are used to retrieve a corresponding portion of target data. This step is shown in FIG. 10, which shows a target data portion 1002 being loaded into a second staging repository 1004 from a target repository 1010.

Figure 11:
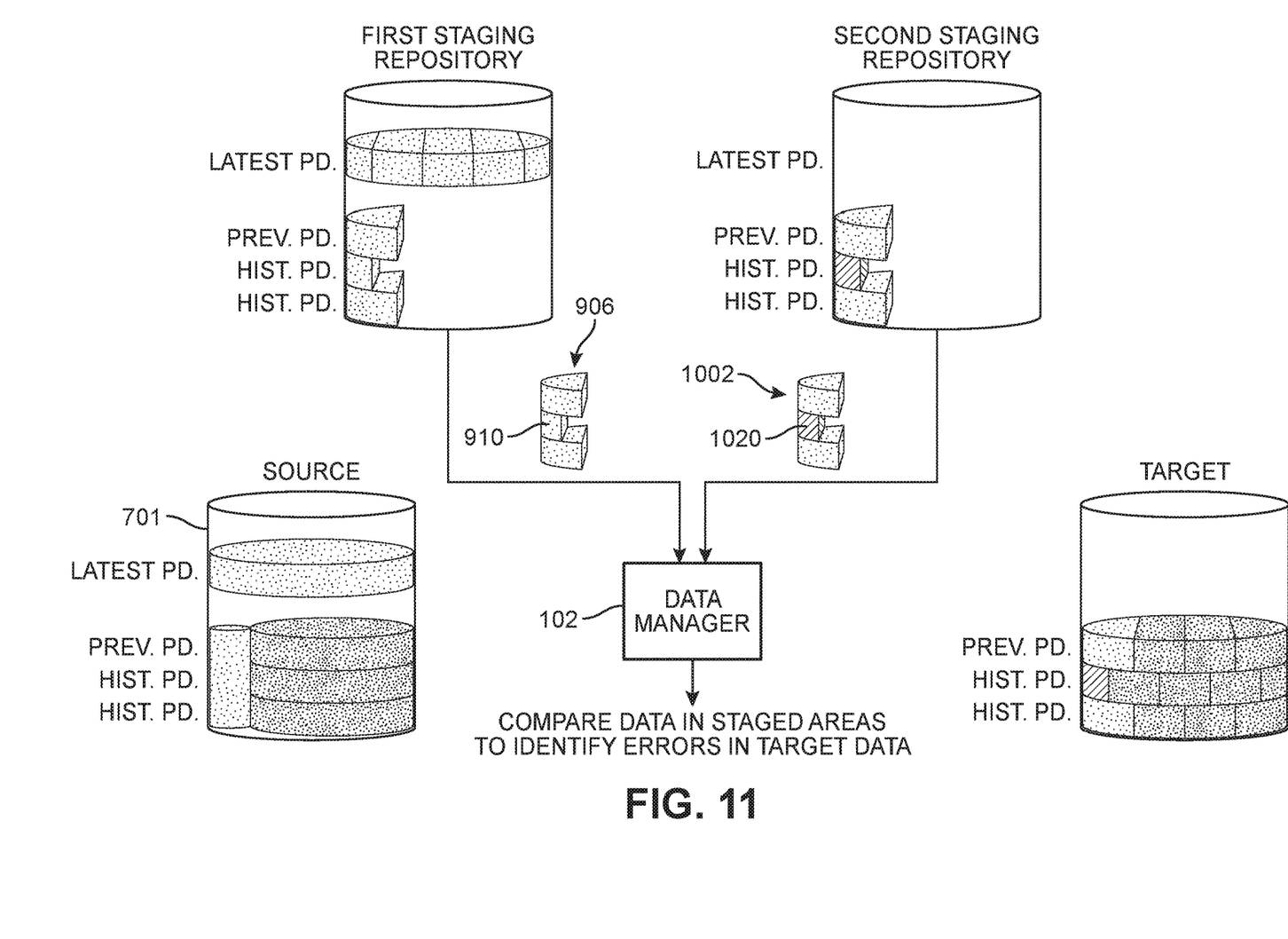
FIG. 11 is a schematic view of a data manager comparing data sets from a first staging repository and from a second staging repository, according to an embodiment.

Next, in step 806, data manager 102 may compare the transformed data (in the first staging repository) with the corresponding portion of data from the target repository (now loaded in second staging repository). More specifically, data manager 102 compares the historical portion of the transformed data with data from the target repository, since the target repository does not yet contain any data related to the latest portion of the transformed data. FIG. 11 shows a schematic view of data manager 102 performing a comparison between transformed historical data portion 906 and target data portion 1002.

In step 808, data manager 102 may determine if there are differences between the historical portion of the transformed data and the corresponding target data. If there are no differences, data manager 102 proceeds to step 810. In step 810, data manager 102 loads only the latest data portion of the transformed data to the target repository. However, if differences are detected in step 808, data manager 102 may proceed to step 812. In step 812, data manager 102 generates a comparison report. This report may include information for an operator and/or end user that identified defects in the target dataset as well as any corrections that may be automatically applied to correct those defects. Next, in step 814, data manager 102 swaps out the corresponding dataset from the target repository with the historical portion of the transformed data. In addition, data manager 102 also updates the target repository to include the latest portion of the transformed data.

Figure 12:
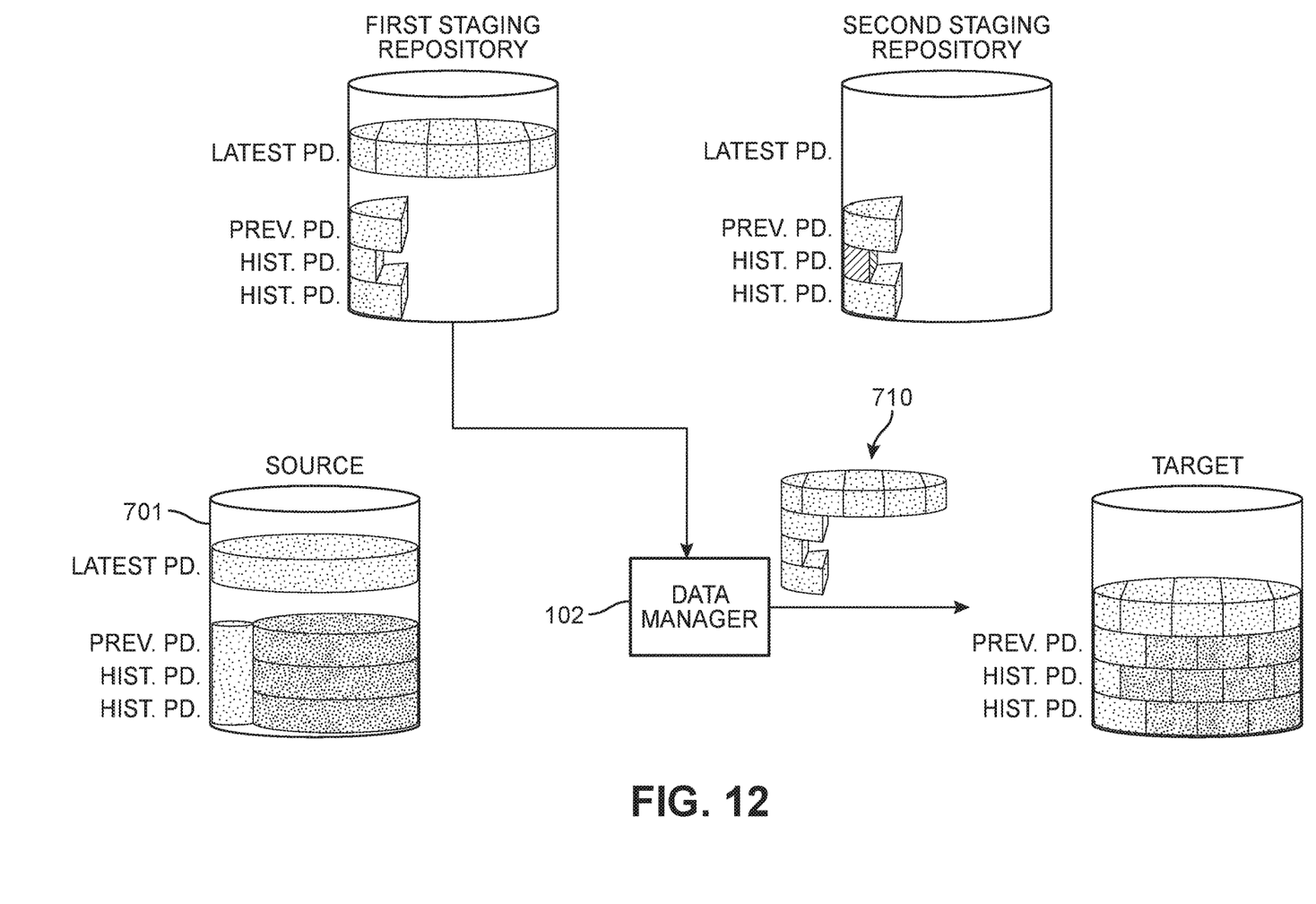
FIG. 12 is a schematic view of a data manager replacing data in a target repository with data in a first staging area, according to an embodiment.

In the example shown in FIG. 11, target data portion 1002 includes a subset of data 1020 that differs from a corresponding subset of data 910 in historical data portion 906 of the transformed data 710 (shown visually using different shading in the Figures). This difference indicates a possible defect in the data stored in the target repository. Thus, in this case the data manager may perform step 812 and step 814 of process 800. To fix this defect, the original portion of target data is replaced with the transformed data 710, as shown in FIG. 12.

In some embodiments, the transformed data may be "hot-swapped" with a subset of existing data in the target repository. This involves a near instantaneous replacement of some of the data in the target repository with the most recent transformed dataset. This swapping can be done as the target data portion is defined using keysets instead of historical time periods. Rather than having to manually back out multiple periods of historical data, therefore, the existing system simply replaces the original target data portion with the recently constructed transformed data portion, which is persisted in a staging repository during the exemplary process. This near instantaneous replacement reduces the time required to update the target repository with corrected data from weeks or months to seconds (or less). Thus, end users can use the system without any interruptions, while automatically generated reports can be used to inform operators and end users of any changes that have been recently made.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/ or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of updating data in a target repository using data from a source repository, comprising:
    establishing a connection with the source repository, wherein the source repository includes data for a first historical period, and data for a second historical period, wherein the second historical period is an older period than the first historical period;
    defining, using keysets, a plurality of historical data portions for data in the source repository, wherein each historical data portion in the plurality of historical data portions includes data from the first historical period and data from the second historical period;
    iteratively updating the target repository by:
        retrieving any latest data from the source repository, wherein the any latest data comprises data that has not been previously retrieved;
        selecting a historical data portion from the plurality of historical data portions;
        retrieving the selected historical data portion using a keyset corresponding to the selected historical data portion;
        transforming the any latest data into a transformed latest data;
        transforming the selected historical data portion into a transformed historical data portion;
        retrieving a target data portion from the target repository, the target data portion corresponding to the selected historical data portion;
        comparing the transformed historical data portion with the target data portion to determine if there is a defect in the target data portion;
        storing the transformed latest data in the target repository; and replacing the target data portion with the transformed historical data portion if there are differences between the transformed historical data portion and the target data portion.

2. The method according to claim 1, wherein the method further includes generating a comparison report between the target data portion and the transformed historical data portion when there are differences between the transformed historical data portion and the target data portion.

3. The method according to claim 1, wherein the target data portion is defined using the keyset corresponding to the selected historical data portion.

4. The method according to claim 1, wherein transforming the selected historical data portion includes reformatting the selected historical data portion.

5. The method according to claim 1, wherein the target repository is a data warehouse.

6. The method according to claim 1, wherein the target repository is a data mart.

7. The method according to claim 1, wherein the plurality of historical data portions defined by the keysets are in one-to-one correspondence with a plurality of target data portions in the target repository.

8. A method of updating data in a target repository using data from a source repository, comprising:
    performing a first update of data in the target repository at a first time, by:
        establishing a connection with the source repository, wherein the source repository includes a first latest data segment comprising data for a first latest period, a first historical data segment comprising data for a first historical period, and a second historical data segment comprising data for a second historical period, wherein the second historical period is an older period than the first historical period;
        defining, using a first keyset, a first historical data portion including at least some data from the first historical data segment and from the second historical data segment;
        defining, using a second keyset, a second historical data portion including at least some data from the first historical data segment and from the second historical data segment;
        retrieving the first latest data segment from the source repository;
        transforming the first latest data segment into a first transformed latest data segment;
        storing the first transformed latest data segment in the target repository;
        retrieving, using the first keyset, the first historical data portion from the source repository;
        transforming the first historical data portion into a first transformed historical data portion;
        comparing the first transformed historical data portion with a corresponding first target data portion from the target repository; and
        replacing the first target data portion with the first transformed historical data portion if there are differences between the first transformed historical data portion and the first target data portion;
    performing a second update of data in the target repository at a second time that is later than the first time, by:
        establishing the connection with the source repository, wherein the source repository includes a second latest data segment comprising data for a second latest period, wherein the second latest period is more recent than the first latest period;
        retrieving the second latest data segment from the source repository;
        transforming the second latest data segment into a second transformed latest data segment;
        storing the second transformed latest data segment in the target repository;
        retrieving, using the second keyset, the second historical data portion from the source repository;
        transforming the second historical data portion into a second transformed historical data portion;
        comparing the second transformed historical data portion with a corresponding second target data portion from the target repository; and
        replacing the second target data portion with the second transformed historical data portion if there are differences between the second transformed historical data portion and the second target data portion.

9. The method according to claim 8, wherein the difference between the first time and the second time is determined by a period at which data is updated in the source repository.

10. The method according to claim 8, wherein the method further includes receiving a notification from the source system that new data is available.

11. The method according to claim 10, wherein the notification is received prior to the second time.

12. The method according to claim 8, wherein the first target data portion is defined using the first keyset.

13. The method according to claim 8, wherein the second target data portion is defined using the second keyset.

14. The method according to claim 8, wherein loading the first transformed latest data segment into the target repository is performed at the same time as replacing the first target data portion with the first transformed historical data portion.

15. The method according to claim 8, wherein the method further includes generating a comparison report between the first target data portion and the first transformed historical data portion when there are differences between the first transformed historical data portion and the first target data portion.

16. The method according to claim 8, wherein loading the second transformed latest data segment portion into the target repository is performed at the same time as replacing the second target data portion with the second transformed historical data portion.

17. A continuous data quality system for moving data from a source repository to a target repository, comprising:
    a device processor;
    a non-transitory computer readable medium storing instructions that are executable by the device processor to:
        establish a connection with the source repository, wherein the source repository includes data for a first historical period, and data for a second historical period, wherein the second historical period is an older period than the first historical period;
        define, using keysets, a plurality of historical data portions for data in the source repository, wherein each historical data portion in the plurality of historical data portions includes data from the first historical period and data from the second historical period;
        iteratively update the target repository by:
            retrieving any latest data from the source repository, wherein the any latest data comprises data that has not been previously retrieved;

selecting a historical data portion from the plurality of historical data portions;

retrieving the selected historical data portion using a keyset corresponding to the selected historical data portion;

transforming the any latest data into a transformed latest data;

transforming the selected historical data portion into a transformed historical data portion;

retrieving a target data portion from the target repository, the target data portion corresponding to the selected historical data portion;

comparing the transformed historical data portion with the target data portion to determine if there is a defect in the target data portion;

storing the transformed latest data in the target repository; and replacing the target data portion with the transformed historical data portion if there are differences between the transformed historical data portion and the target data portion.

18. The continuous data quality system according to claim 17, wherein the continuous data quality system includes a data comparison module for comparing the transformed historical data portion with the target data portion.

19. The continuous data quality system according to claim 17, wherein the data manager includes a data transformation module for transforming the selected historical data portion into the transformed historical data portion.

20. The continuous data quality system according to claim 17, wherein the target repository is a data warehouse.

\* \* \* \* \*